US011417020B2

(12) United States Patent
Zolotov et al.

(10) Patent No.: US 11,417,020 B2
(45) Date of Patent: Aug. 16, 2022

(54) DETECTION OF CALIBRATION ERRORS

(71) Applicant: ZEBRA TECHNOLOGIES CORPORATION, Lincolnshire, IL (US)

(72) Inventors: Serguei Zolotov, Ottawa (CA); Lawrence Allen Stone, Austin, TX (US)

(73) Assignee: Zebra Technologies Corporation, Lincolnshire, IL (US)

( * ) Notice: Subject to any disclaimer, the term of this patent is extended or adjusted under 35 U.S.C. 154(b) by 190 days.

(21) Appl. No.: 16/842,160

(22) Filed: Apr. 7, 2020

(65) Prior Publication Data
US 2021/0312663 A1 Oct. 7, 2021

(51) Int. Cl.
*G06T 7/00* (2017.01)
*G06T 7/593* (2017.01)
*G06T 7/80* (2017.01)

(52) U.S. Cl.
CPC ............... *G06T 7/85* (2017.01); *G06T 7/593* (2017.01); *G06T 7/97* (2017.01); *G06T 2207/10012* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 7,277,599 B2* | 10/2007 | Eian | ...................... | H04N 13/261 382/285 |
| 8,478,001 B2* | 7/2013 | Aoki | ..................... | G06K 9/3216 382/106 |
| 9,210,404 B2* | 12/2015 | Hall | ...................... | H04N 13/254 |
| 10,015,473 B2* | 7/2018 | Ito | ......................... | H04N 13/239 |
| 10,210,628 B2* | 2/2019 | Domae | .................. | H04N 5/907 |
| 10,769,813 B2* | 9/2020 | Kuehnle | ................... | G06T 7/55 |
| 11,172,996 B1* | 11/2021 | Qian | ....................... | G06T 19/20 |
| 11,195,011 B2* | 12/2021 | Klaus | ................. | H04N 5/23299 |
| 2004/0170315 A1* | 9/2004 | Kosaka | .................... | G06T 5/006 382/154 |
| 2018/0307941 A1* | 10/2018 | Holz | ......................... | B66F 9/00 |
| 2019/0094981 A1* | 3/2019 | Bradski | .............. | G02B 27/0093 |
| 2021/0158552 A1* | 5/2021 | Berger | .................... | G06T 7/586 |
| 2021/0239793 A1* | 8/2021 | Yu | ......................... | G01S 7/4026 |
| 2021/0316743 A1* | 10/2021 | Chang | .................. | G01S 17/931 |
| 2021/0343035 A1* | 11/2021 | Liyanaarachchi | ... | H04N 13/296 |
| 2021/0383086 A1* | 12/2021 | Drzymala | ............ | G06K 7/1413 |

FOREIGN PATENT DOCUMENTS

JP 2017516187 A * 6/2017

OTHER PUBLICATIONS

JP2017516187A—English translation (Year: 2017).*

* cited by examiner

*Primary Examiner* — Soo Shin

(57) ABSTRACT

A method includes: obtaining a stereo pair of images from a stereo camera assembly of a mobile computing device, the stereo pair of images depicting a first marker and a second marker each associated with the mobile computing device; determining, from the stereo pair of images, a distance between the first and second markers; comparing a threshold to a difference between the determined distance and a reference distance corresponding to the first and second reference markers; and when the difference exceeds the threshold, generating an alert notification.

21 Claims, 9 Drawing Sheets

DETECTION OF CALIBRATION ERRORS

BACKGROUND

Stereo imaging may be employed to generate point clouds, dimension objects, and the like. Stereo imaging hardware may be deployed on mobile computing devices, e.g. to enable mobile dimensioning of objects such as packages in warehouses or other facilities. However, the accuracy of information generated from stereo images, such as object dimensions, may be negatively affected by miscalibration of the imaging hardware.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
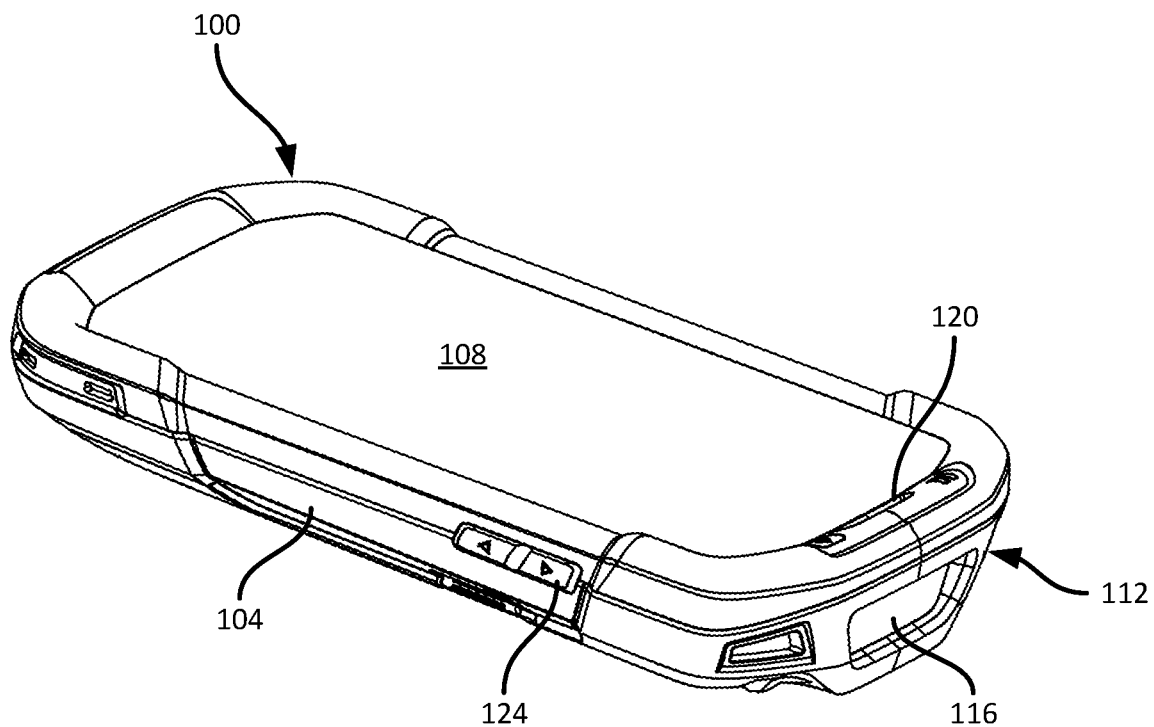
FIG. 1 is a diagram illustrating a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: obtaining a stereo pair of images from a stereo camera assembly of a mobile computing device, the stereo pair of images depicting a first marker and a second marker each associated with the mobile computing device; determining, from the stereo pair of images, a distance between the first and second markers; comparing a threshold to a difference between the determined distance and a reference distance corresponding to the first and second reference markers; and when the difference exceeds the threshold, generating an alert notification.

Additional examples disclosed herein are directed to a computing device, comprising: a stereo camera assembly; and a controller connected with the stereo camera assembly, the controller configured to: obtain a stereo pair of images from the stereo camera assembly, the stereo pair of images depicting a first marker and a second marker each associated with the computing device; determine, from the stereo pair of images, a distance between the first and second markers; compare a threshold to a difference between the determined distance and a reference distance corresponding to the first and second reference markers; and when the difference exceeds the threshold, generate an alert notification.

Further examples disclosed herein are directed to a non-transitory computer-readable medium storing instructions executable by a processor of a mobile computing device to: obtain a stereo pair of images from a stereo camera assembly, the stereo pair of images depicting a first marker and a second marker each associated with the mobile computing device; determine, from the stereo pair of images, a distance between the first and second markers; compare a threshold to a difference between the determined distance and a reference distance corresponding to the first and second reference markers; and when the difference exceeds the threshold, generate an alert notification.

FIG. 1 illustrates a mobile computing device 100 (also referred to herein as the mobile device 100 or simply the device 100) that is enabled to capture stereo pairs of images and, for example, determine dimensions of objects represented in the image pairs. Examples of such objects include packages in a transport and logistics facility, or the like. The device 100 therefore includes a stereo imaging assembly. The device 100 is configured, as will be discussed in greater detail below, to detect miscalibration of the stereo imaging assembly. In general, miscalibration includes any variance between the actual positions of the components of the stereo imaging assembly and the expected (i.e. reference) positions of such components.

Miscalibration may result from thermal expansion or contraction, which an lead to shifting of components such as lenses, portions of the device housing, and the like. Miscalibration may also be caused by drops or other impacts to the device 100. Because determining information such as object dimensions from stereo images employs the above-mentioned reference positions of imaging components, changes to component positions can lead to inaccurate results.

The device 100 includes a housing 104 supporting various other components of the device 100. Among the components supported by the housing 104 are a display 108 that, in the illustrated example, also includes an integrated touch screen. The housing 104 can also support a data capture module 112, such as a barcode scanner with a scan window 116 through which the module 112 can capture images and/or emit laser beams to detect and decode indicia such as barcodes affixed to objects within the above-mentioned facility.

The device 100 can also include other devices in addition to the display 108, such as a speaker 120. The device 100 can also include further output devices, such as a haptic output device, an indicator light, and the like. The device 100 can also include input devices in addition to the above-mentioned touch screen, including any one or more of a microphone, at least one button, a trigger, and the like. Such input devices are indicated as an input assembly 124 in FIG. 1 (including buttons on a side of the housing 104).

Figure 2:
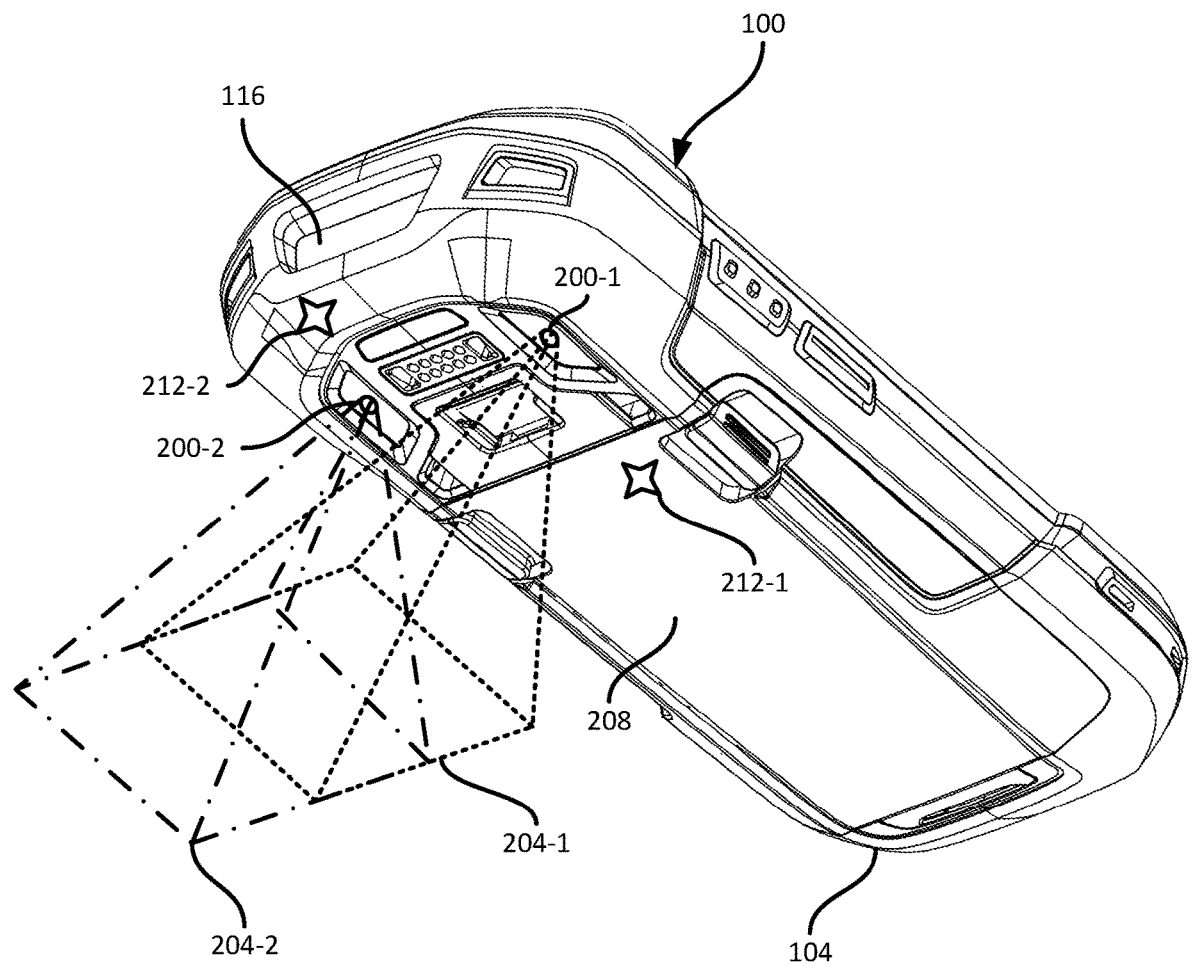
FIG. 2 is a diagram illustrating a rear view of the mobile computing device of FIG. 1.

Turning to FIG. 2, which illustrates a rear view of the device 100, the device 100 also includes a stereo camera assembly. The stereo camera assembly includes a first camera 200-1 and a second camera 200-2, spaced apart on the housing 104 of the device 100. The cameras 200 each include a suitable image sensor or combination of image sensors, optical components (e.g. lenses) and the like. The cameras 200 have respective fields of view (FOV) 204-1 and 204-2 extending away from a back surface 208 of the device 100 (opposite the display 108). The FOVs 204, in the illustrated example, are substantially perpendicular to the back surface 208.

The FOVs 204 overlap, as illustrated in FIG. 2, enabling the device 100 to determine information such as object dimensions for any objects that appear in both FOVs 204. The degree of overlap shown in FIG. 2 is purely for illustrative purposes. In other examples, the FOVs 204 may overlap to a greater or smaller degree than illustrated.

The device 100 also includes at least two markers 212-1 and 212-2. The markers 212 are shown as being disposed on the rear of the device 100 (e.g. on the back surface 208). In other examples, the markers 212 may be disposed on another side of the device 100. The device 100 may also include more than the two markers 212 shown in FIG. 2. More generally, the device 100 can include various numbers of markers 212, positioned such that at least two markers 212 fall within the overlapping portion of the FOVs 204. As will now be apparent, markers 212 may fall within the FOVs 204 of the device on which they are mounted when the device 100 is operated to capture images of itself in a mirror or other reflective surface. Markers 212 for use under such conditions are placed on the rear of the device 100. The device 100 may also be operated to capture stereo images of another identical device 100, however, in which case the markers 212 need not be on the rear surface of the device 100.

The markers 212 are, in the present example, fiducial markers including reflective material (e.g. retroreflectors). The markers 212 can reflect visible light, infrared light, or a combination thereof. The markers 212 may be applied to the housing 104, e.g. as stickers, paint or the like, or may be embedded or otherwise integrated with the housing 104. In other examples, the markers 212 and/or the cameras 200 can be supported by an accessory housing distinct from the housing 104 of the device 100. Such an accessory housing can be removably attached to the device housing 104.

As will be discussed herein, the device 100 is configured to detect the markers 212, either those on the device 100 itself or another identical device 100, in a stereo pair of images captured via the cameras 200. Having detected the markers 212, the device 100 is configured to determine a distance therebetween and compare the distance to a reference distance. The reference distance is the expected distance between the markers 212 (e.g. defined by manufacturing of the device 100). Deviations between the distance determined from the captured images and the reference distance therefore indicate miscalibration, e.g. due to deformation of the housing 104.

Before further discussing the functionality implemented by the device 100, certain components of the device 100 will be described, with reference to FIG. 3.

Figure 3:
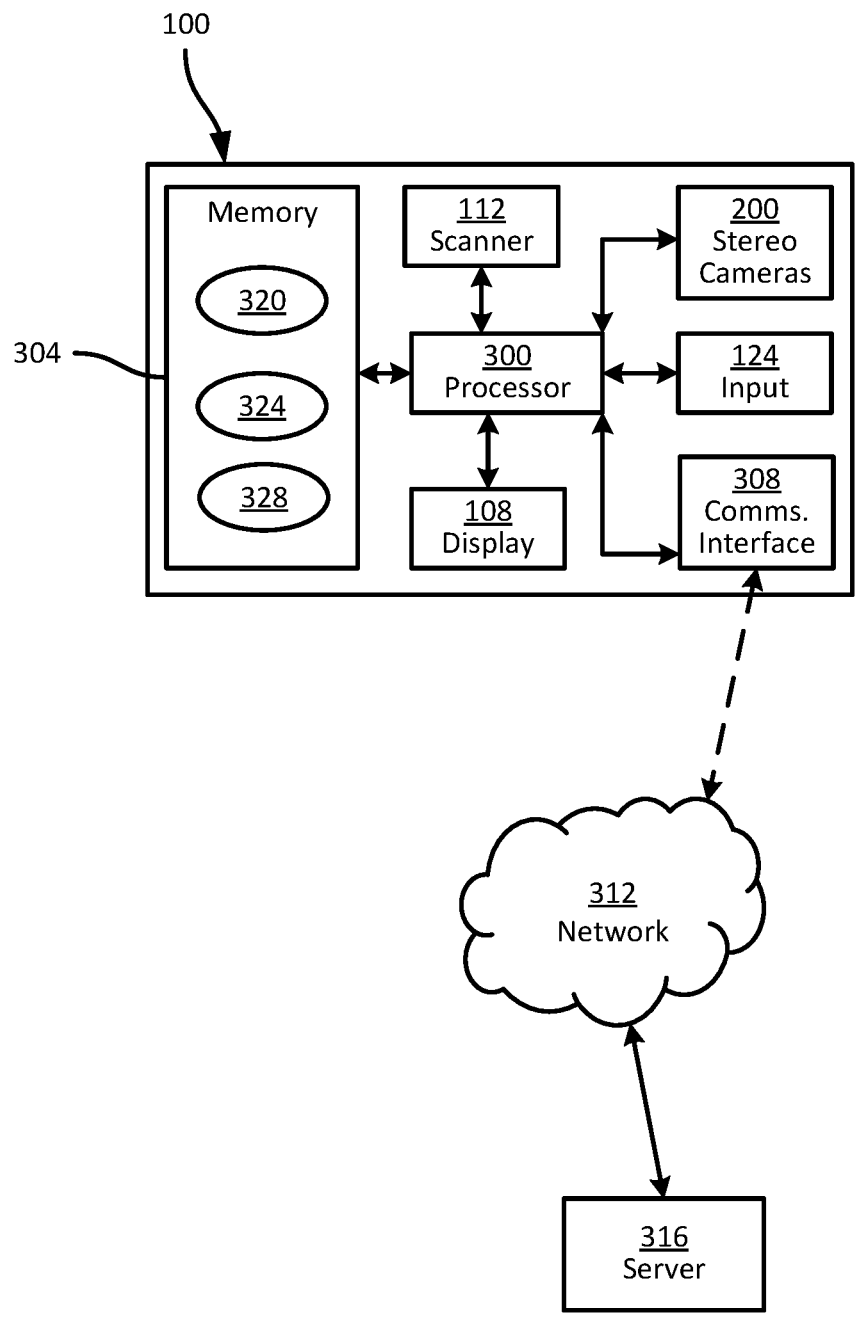
FIG. 3 is a block diagram of certain internal hardware components of the mobile computing device of FIG. 1.

Referring to FIG. 3, a block diagram of certain components of the device 100 is illustrated. In addition to the display (and integrated touch screen, in this example) 108, the data capture module 112, input assembly 124 and cameras 200, the device 100 includes a special-purpose controller, such as a processor 300, interconnected with a non-transitory computer readable storage medium, such as a memory 304. The memory 304 includes a combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits.

The device 100 also includes a communications interface 308 enabling the device 100 to exchange data with other computing devices, e.g. via a network 312. The other computing devices can include a server 316, which may be deployed within the facility in which the device 100 is deployed. The server 316 can also be deployed remotely from the above-mentioned facility.

The memory 304 stores computer readable instructions for execution by the processor 300. In particular, the memory 304 stores a calibration application 320 which, when executed by the processor 300, configures the processor 300 to process stereo pairs of images captured via the cameras 200 to verify whether the cameras 200 have become mis-calibrated.

The processor 300, when so configured by the execution of the applications 320 and 324, may also be referred to as a calibration controller, or simply a controller. Those skilled in the art will appreciate that the functionality implemented by the processor 300 via the execution of the application 320 may also be implemented by one or more specially designed hardware and firmware components, such as FPGAs, ASICs and the like in other embodiments.

The memory 304 can also store a plurality of other applications for execution by the processor 300. For example, the other applications can include a first photogrammetry application executable by the processor 300 to determine package dimensions using images captured with the cameras 200. Operations associated with the first application 324 may have an accuracy target, e.g. of dimensions measured to within one inch of actual dimensions. The memory 304 also stores, in the illustrated example, a second photogrammetry application 328 executable by the processor 300 to measure dimensions of parts in a machining operation (e.g. pipe lengths). Operations associated with the second application 328 may have an accuracy target different from the operations associated with the application 324. For example, measurements generated via execution of the application 328 may be expected to be accurate to within an eighth of an inch.

Figure 4:
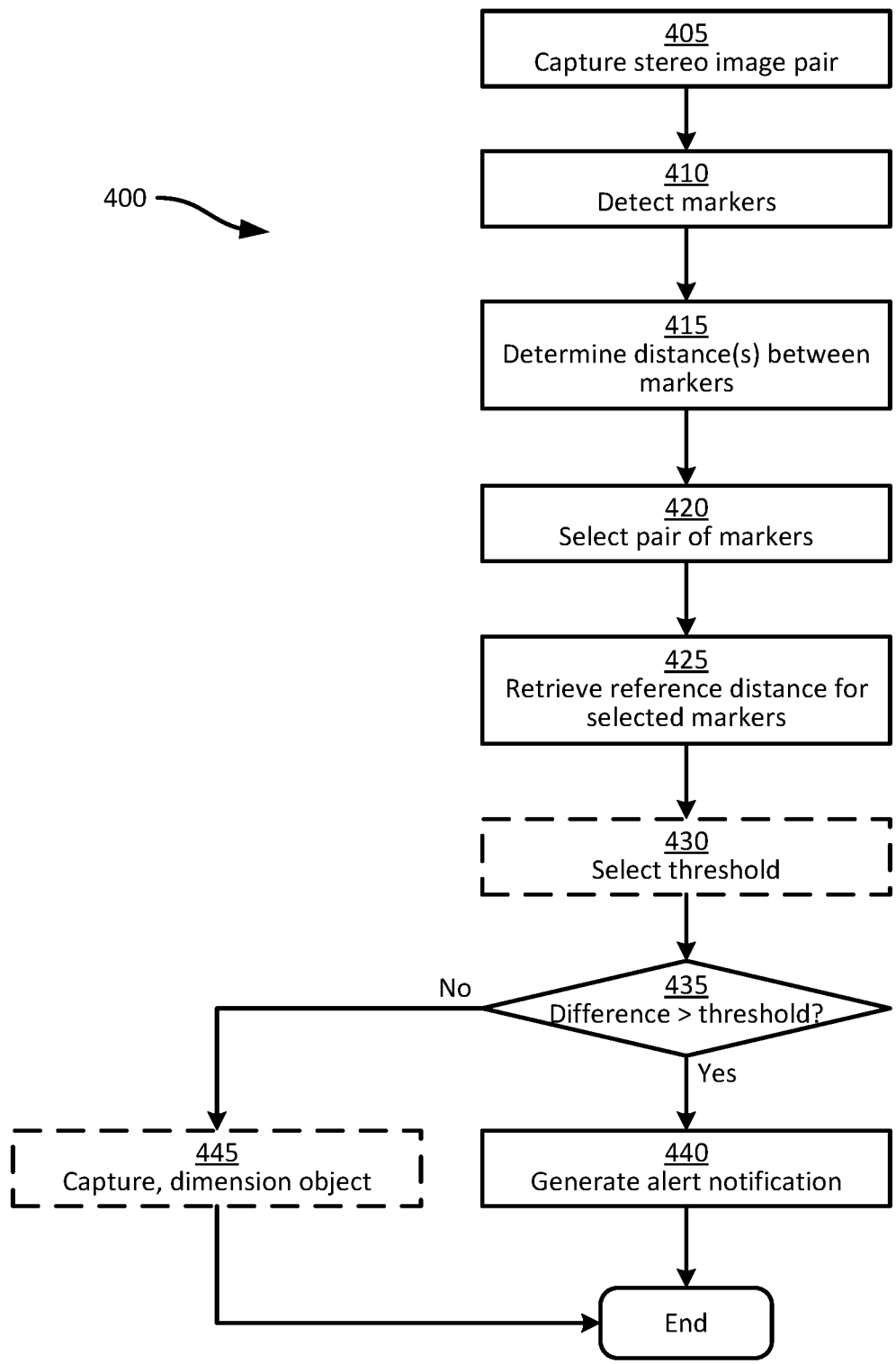
FIG. 4 is a flowchart of a method of detecting calibration errors.

Turning now to FIG. 4, the functionality implemented by the device 100 will be discussed in greater detail. FIG. 4 illustrates a calibration verification method 400, which will be discussed below in conjunction with its performance by the device 100.

Figure 5:
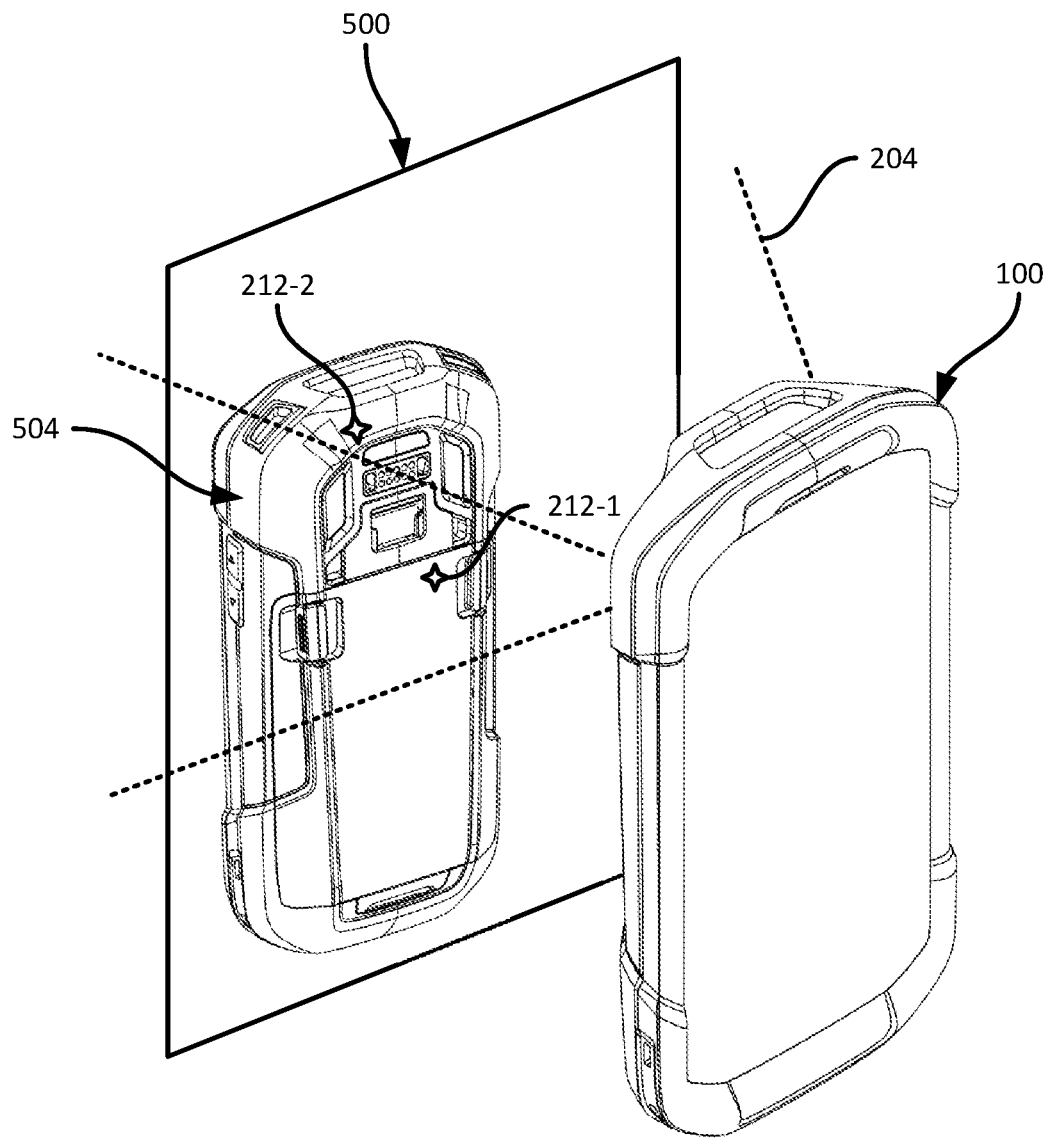
FIG. 5 is a diagram illustrating a performance of block 405 of the method of FIG. 4.

At block 405, the device 100 is configured to capture a stereo pair of images by controlling the cameras 200. The performance of block 405 may be initiated by activation of an input (e.g. the button shown in FIG. 1) of the device 100 by an operator of the device 100. Prior to capturing the images at block 405, the device 100 is positioned such that either the device 100, or another identical device 100, is within the FOVs 204 of the cameras 200. Turning to FIG. 5, the device 100 is shown positioned for image capture at block 405. In particular, the device 100 is placed adjacent to a reflective surface such as a mirror 500, in which a reflection 504 of the device 100, including the markers 212, is visible.

The reflective surface 500 is a flat reflective surface in the illustrated example, having minimal or zero curvature. Reduced curvature of the reflective surface enables the device 100 to determine distances between the markers 212 with increased accuracy relative to images captured via a curved reflective surface.

As illustrated in FIG. 5, at least a portion of the reflection 504 including the markers 212 is within the FOV 204 of the cameras 200. Thus, the stereo pair of images captured at block 405 depict the markers 212-1 and 212-2 (that is, each of the stereo pair of images contains both markers 212).

Returning to FIG. 4, at block 410 the device (in particular, the processor 300 as configured via execution of the application 320) is configured to detect the markers 212 in the images captured at block 405. Detection of the markers 212 can be performed by searching each image for regions of elevated intensity, for example in the case of retroreflector markers, which generate bright spots in images. The device 100, in other words, can identify bright regions in each image (e.g. with a brightness exceeding a threshold), and determine a location, in each image, of a center of each bright region.

Figure 6:
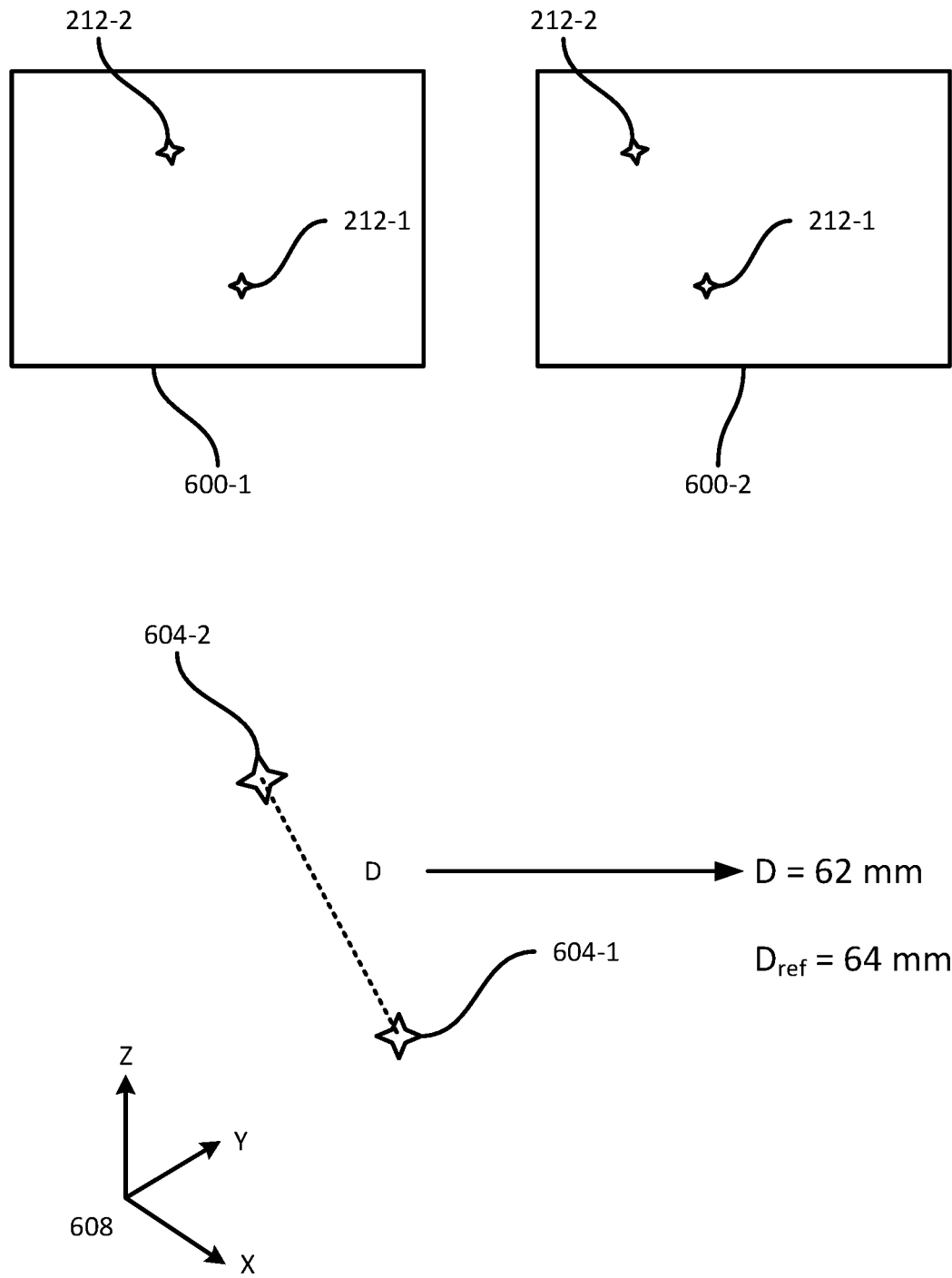
FIG. 6 is a diagram illustrating a performance of block 415 of the method of FIG. 4

At block 415, the device 100 is configured to determine the distance between each pair of markers 212 detected at block 410. In the present example, the device 100 includes only two markers 212 and the performance of block 415 therefore involves the determination of only one distance. Turning to FIG. 6, a stereo pair of images 600-1 and 600-2 (captured by the cameras 200-1 and 200-2, respectively) are shown, with the detected markers 212-1 and 212-2 in isolation. To determine a distance between the markers 212, the device 100 processes the images to determine a three-dimensional position of each marker 212. For example, FIG. 6 also illustrates three dimensional positions 604-1 and 604-2 of the markers 212-1 and 212-2, respectively, according to a three-dimensional frame of reference 608. Having determined the positions 604 of the markers in three dimensions, the device 100 determines a distance "D" between the positions 604. In the illustrated example, the determined distance is assumed to be 62 mm.

Figure 7:
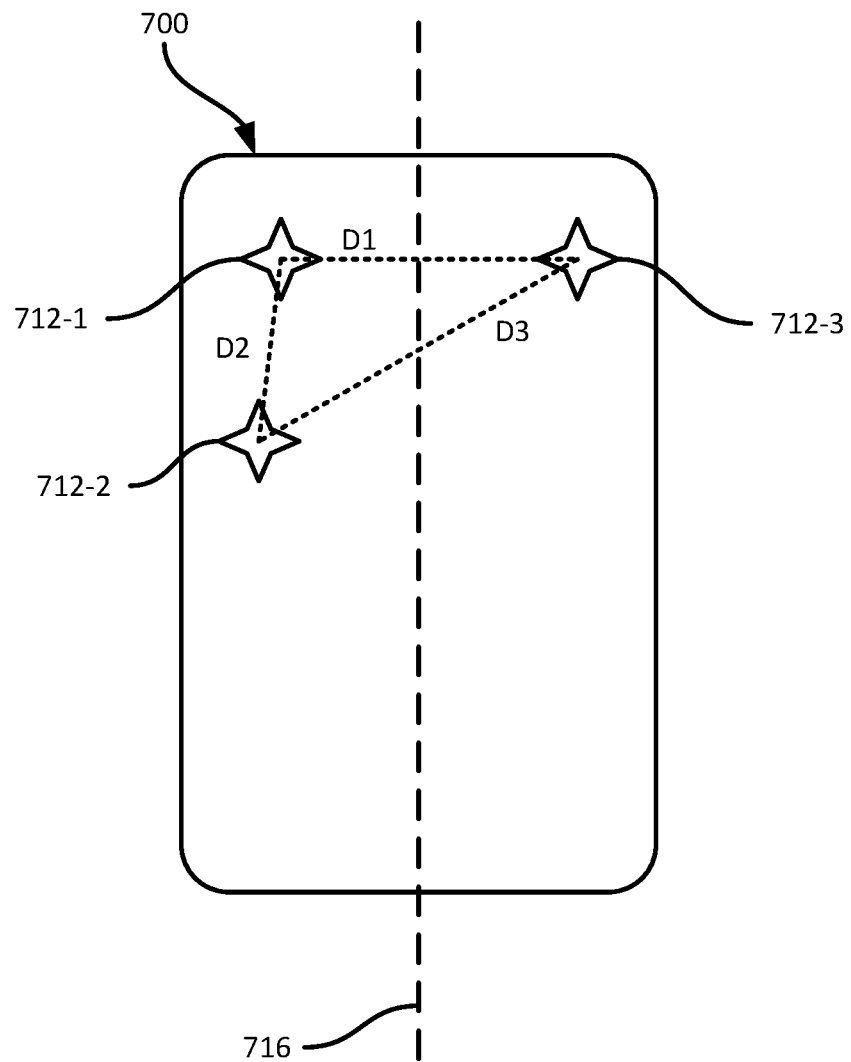
FIG. 7 is a diagram illustrating a rear side of another example mobile computing device.

Returning to FIG. 4, at block 420, the device 100 is configured to select a pair of the markers 212 for subsequent processing. In the example shown in FIGS. 2 and 5-6, the device 100 includes only two markers 212, and the markers 212-1 and 212-2 are therefore selected at block 420. In other examples, however, the device 100 can include more than two markers 212. Turning to FIG. 7, another example device 700 is shown with three markers 712-1, 712-2 and 712-3 disposed thereon. In the example shown in FIG. 7, assuming all three markers 712 are successfully detected in the images captured at block 405 (e.g. no markers 712 have been damaged or occluded), the device 100 determines three distances D1, D2 and D3 at block 415, corresponding to each pair of markers 712 detected at block 410.

At block 420, the device 100 is configured to select a pair of markers 712 for subsequent processing from the three available pairs. In some examples, the device 100 selects the pair of markers 712 separated by the greatest distance (e.g. the markers 712-1 and 712-3 in the illustrated example). Markers separated by greater distances may be more sensitive to mis-calibration errors. In other examples, the device 100 may select the pair of markers for which the three-dimensional positions were detected with the greatest confidence.

Returning to FIG. 4, at block 425 the device 100 is configured to retrieve a reference distance for the pair of markers selected at block 420. The reference distance can be stored, for example in the memory 304 as data associated with the application 320. In the example shown in FIGS. 5 and 6, a single reference distance "Dref" may therefore be stored in association with the markers 212-1 and 212-2. As shown in FIG. 6, the reference distance is 64 mm (in contrast with the determined distance of 62 mm from block 415).

In examples with more than one possible pair of markers, such as the example shown in FIG. 7, the device 100 can store a plurality of reference distances (three, in the case of the implementation of FIG. 7). One of the stored reference distances is therefore retrieved at block 425, according to the selected pair of markers from block 420. The device 100 can be configured to determine which reference distance to select according to various mechanisms.

In some examples, the device 100 can also store relative positions of the markers 712 in the memory 304 (e.g. an expected marker layout), and compare the images captured at block 405 to the stored relative positions, in order to identify each marker 712 in the images. Having identified the markers (i.e. distinguished the markers 712 from one another) in the captured images, the device 700 can then select the relevant reference distance. In the above examples, the device 700 may determine (e.g. at block 410) whether the images captured at block 405 depict the device 700 itself via a reflective surface, or whether the images depict another device. To that end, the markers 712 are disposed asymmetrically relative to a centerline 716 of the device 700. The device 700 can therefore be configured to detect the device 700 (e.g. the perimeter of the device 700) in the captured images and the centerline 716. Having detected the centerline 716, the device 700 is configured to detect, for example, a number of markers 712 on each side of the centerline 716, a relative orientation of the markers 712 relative to the centerline 716, or the like. By comparing the detected number and/or orientation of markers 712 on each side of the centerline 716, the device 700 can determine whether the images from block 405 are mirrored or not. The expected marker layout can then be mirrored before comparison to the images to identify each marker 712, when the images are mirrored.

In other examples, the device 100 may avoid storing relative positions of the markers and identifying which marker is which in the captured images by instead comparing the distance separating the selected pair of markers 712 to each stored reference distance, and selecting the reference distance that is closest to the distance determined at block 415 for the selected pair of markers 712. This mechanism relies on each pair of the markers 712 being placed at a substantially different distance than the other pairs, and on the assumption that deviations from reference distances are expected to be relatively small (i.e. smaller than the differences between reference distances).

Having determined an observed distance between a particular pair of markers (via blocks 415-420) and selected a corresponding reference distance, the device is configured to determine a difference between the observed distance and the reference distance, and to determine whether that distance exceeds a threshold. If the difference exceeds the threshold, the device 100 is considered to be mis-calibrated.

In particular, at block 430 the device 100 can be configured to select a threshold from among a set of thresholds corresponding to distinct applications. For example, the device 100 may store distinct thresholds corresponding to each of the applications 324 and 328. Each threshold indicates a distance to be compared to the above-mentioned difference. As noted earlier, the applications 324 and 328 may be used in association with operations requiring different levels of measurement accuracy. The threshold associated with the application 324 may be 3 mm, for example, while the threshold associated with the application 328 may be 1 mm.

At block 430 the device 100 identifies an active application (e.g. from the applications 324 and 328), and selects the threshold corresponding to the active application. Identifying an active application can include determining which of the applications 324 and 328 is currently being executed by the processor 300 alongside the application 320. In other examples, the device 100 stores a single threshold to be applied regardless of the active application. In such examples, block 430 may be omitted.

At block 435, the device 100 is configured to determine whether the difference between the observed distance determined at block 415 and the reference distance selected at block 425 exceeds the threshold selected at block 430. In the example illustrated in FIG. 6, using the above-mentioned threshold of 1 mm, the determination is affirmative as the difference between the distances D and Dref is 2 mm.

Figure 8:
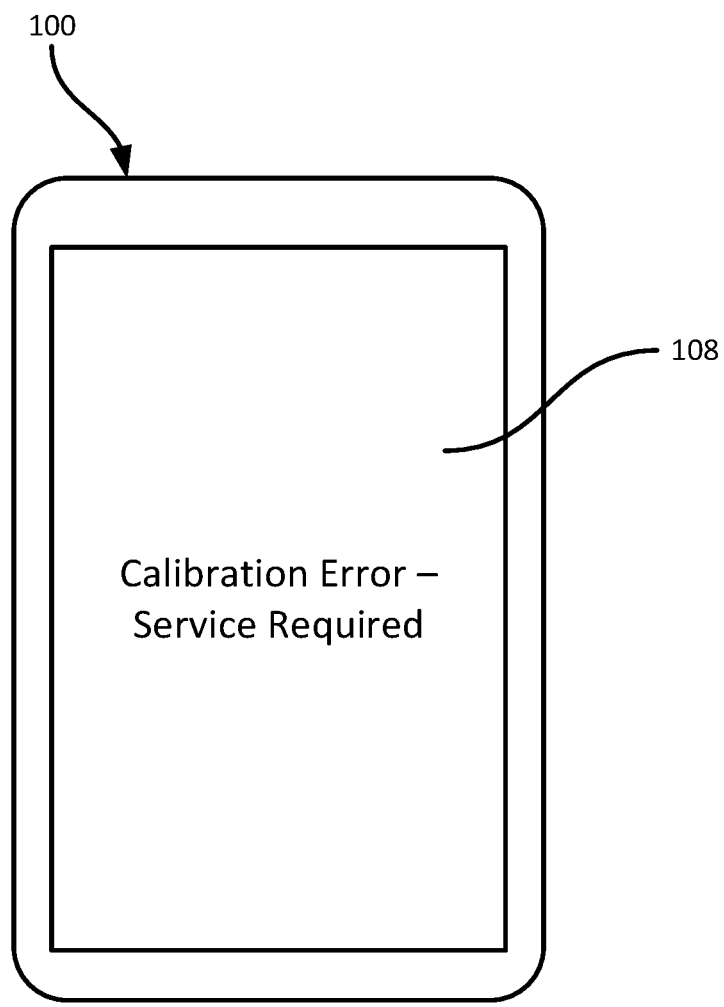
FIG. 8 is a diagram illustrating a performance of block 440 of the method of FIG. 4.

Following a negative determination at block 435, the device 100 proceeds to block 440. At block 440, the processor 300 generates an alert notification indicating that the stereo cameras 200 are mis-calibrated. The alert notification can be generated by controlling one or more output devices of the device 100, such as the display 108, speaker 120, or the like. For example, FIG. 8 illustrates an example alert notification presented on the display 108.

In other examples, the device 100 can generate and transmit a message containing the alert notification to another computing device, such as the server 316 shown in FIG. 3. Transmission of an alert notification message can be performed in addition to, or instead of, local presentation of the alert notification as in FIG. 8. The device 100 may also, at block 440, interrupt execution of applications that rely on the cameras 200, such as the applications 320 and 328. When an application-specific threshold has been exceeded at block 435, the alert notification may indicate the affected application(s), and the execution of those applications may be interrupted while the execution of other applications (with more modest accuracy requirements) may be permitted to continue.

When the determination at block 435 is negative, indicating that any observed deviation from the reference distance is below the selected threshold, operation of the device 100 may continue without the generation of an alert notification. For example, as shown at block 445, the device 100 may continue to capture images via the cameras 200 and detect and dimension objects from such images, e.g. via execution of the application 324.

Figure 9:
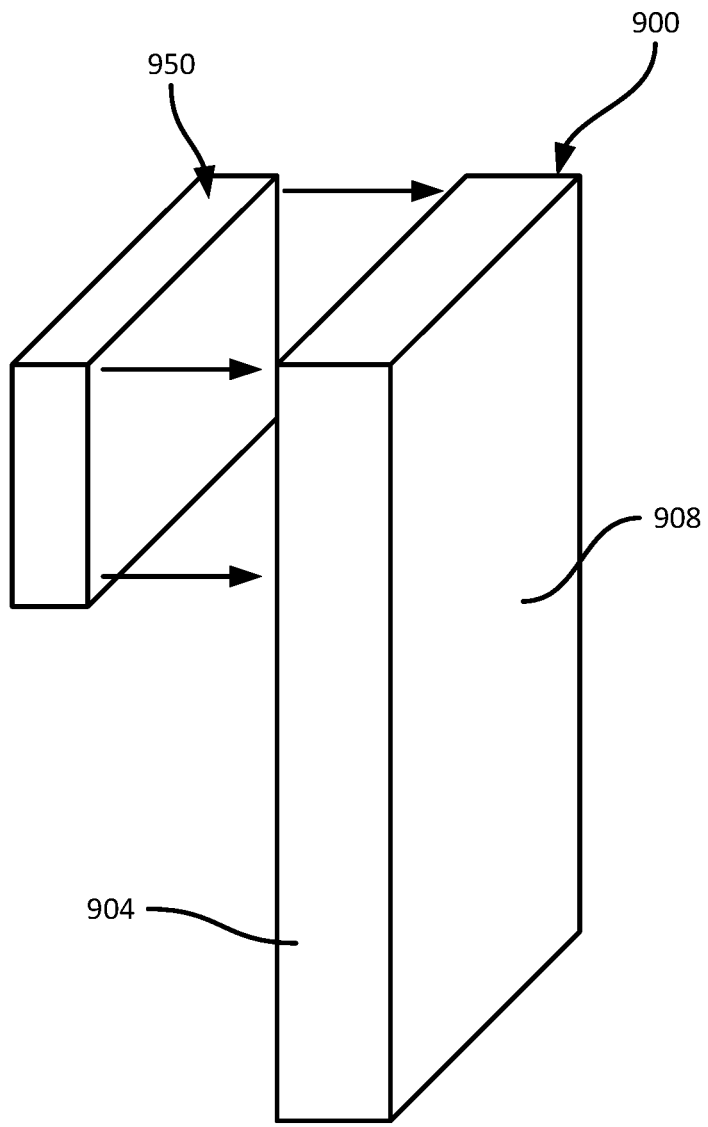
FIG. 9 is a diagram illustrating a further example mobile computing device and stereo imaging accessory.

Variations to the above mis-calibration detection mechanisms are contemplated. In some examples, as noted earlier, the cameras 200 and/or the markers 212 can be implemented on an accessory housing distinct from the housing 104 of the device 100. Referring to FIG. 9, an example device 900 is shown, having a housing 904 supporting a display 908. As will be apparent to those skilled in the art, the housing 904 may also support an input assembly, other output devices, a processor, memory and the like. However, the housing 904 does not support a stereo pair of cameras. Instead, an accessory 950 supports the cameras and markers, and can be removably connected to the device housing 904.

The accessory housing 950 can also contain processing circuitry configured to process images captured via the stereo cameras, such that the accessory is configured to perform the method of FIG. 4, rather than the processor of the device 900 itself. Alert notifications generated by the accessory may, for example, be passed to the device 900 via an electrical interface, for rendering on the display 908, transmission to the server 316, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
    obtaining a stereo pair of images from a stereo camera assembly of a mobile computing device, the stereo pair of images depicting a first marker and a second marker each associated with the mobile computing device;
    determining, from the stereo pair of images, a distance between the first and second markers;
    determining an active application executing at the mobile computing device;
    selecting a threshold from a plurality of application-specific thresholds according to the active application;
    comparing the threshold to a difference between the determined distance and a reference distance between the first and second markers; and
    when the difference exceeds the threshold, generating an alert notification.

2. The method of claim 1, wherein determining the distance includes:
    detecting positions of the first and second markers in the pair of stereo images;
    determining three-dimensional positions of the first and second markers based on the detected positions; and
    determining a distance between the three-dimensional positions.

3. The method of claim 1, further comprising:
    detecting a plurality of markers from the stereo pair of images; and
    selecting the first and second markers from the plurality.

4. The method of claim 3, further comprising:
    determining respective distances between each pair of the plurality of markers; and
    selecting, as the first and second markers, a pair of the plurality of markers separated by a greatest one of the respective distances.

5. The method of claim 1, further comprising:
    detecting a device centerline from the stereo pair of images;
    detecting a plurality of markers, including the first and second markers, in the stereo pair of images;
    determining whether the stereo pair of images are mirrored based on the centerline and the plurality of markers; and
    when the stereo pair of images are mirrored, mirroring an expected marker layout prior to determining the distance between the first and second markers based on the mirrored expected marker layout.

6. The method of claim 1, wherein the first and second markers are carried on the mobile computing device, and wherein obtaining the pair of stereo images comprises capturing the pair of stereo images via a reflective surface.

7. The method of claim 1, wherein the first and second markers are carried on a second mobile computing device, identical to the mobile computing device.

8. The method of claim 1, further comprising:
    when the difference does not exceed the threshold, capturing a further pair of stereo images;
    detecting an object in the further pair of stereo images; and
    dimensioning the object based on the further pair of stereo images.

9. The method of claim 1, wherein generating the alert notification includes at least one of:
    controlling an output device of the mobile computing device to present the alert notification; and
    sending a message to a server via a communications interface of the mobile computing device.

10. A computing device, comprising:
    a stereo camera assembly; and
    a controller connected with the stereo camera assembly, the controller configured to:
        obtain a stereo pair of images from the stereo camera assembly, the stereo pair of images depicting a first marker and a second marker each associated with the computing device;
        determine, from the stereo pair of images, a distance between the first and second markers;
        determine an active application executing at the mobile computing device;
        select a threshold from a plurality of application-specific thresholds according to the active application;
        compare the threshold to a difference between the determined distance and a reference distance between the first and second markers; and
        when the difference exceeds the threshold, generate an alert notification.

11. The computing device of claim 10, wherein the controller is configured, in order to determine the distance, to:
    detect positions of the first and second markers in the pair of stereo images;
    determine three-dimensional positions of the first and second markers based on the detected positions; and
    determine a distance between the three-dimensional positions.

12. The computing device of claim 9, wherein the controller is further configured to:
    detect a plurality of markers from the stereo pair of images; and
    select the first and second markers from the plurality.

13. The computing device of claim 12, wherein the controller is further configured to:

determine respective distances between each pair of the plurality of markers; and select, as the first and second markers, a pair of the plurality of markers separated by a greatest one of the respective distances.

14. The computing device of claim 10, wherein the plurality of markers are disposed asymmetrically relative to a device centerline; and wherein the processor is further configured to:

detect a device centerline from the stereo pair of images;

detect a plurality of markers, including the first and second markers, in the stereo pair of images;

determine whether the stereo pair of images are mirrored based on the centerline and the plurality of markers; and when the stereo pair of images are mirrored, mirror an expected marker layout prior to determination of the distance between the first and second markers based on the mirrored expected marker layout.

15. The computing device of claim 10, wherein the first and second markers are carried on the computing device, and wherein obtaining the pair of stereo images comprises capturing the pair of stereo images via a reflective surface.

16. The computing device of claim 10, wherein the first and second markers are carried on a second computing device, identical to the mobile computing device.

17. The computing device of claim 10, wherein the controller is further configured to:

when the difference does not exceed the threshold, capture a further pair of stereo images;

detect an object in the further pair of stereo images; and dimension the object based on the further pair of stereo images.

18. The computing device of claim 10, wherein the processor is further configured, in order to generate the alert notification, to at least one of:

control an output device of the computing device to present the alert notification; and send a message to a server via a communications interface of the computing device.

19. A method, comprising:

obtaining a stereo pair of images from a stereo camera assembly of a mobile computing device, the stereo pair of images depicting a first marker and a second marker each associated with the mobile computing device;

determining, from the stereo pair of images, a distance between the first and second markers;

comparing a threshold to a difference between the determined distance and a reference distance between the first and second markers;

when the difference exceeds the threshold, generating an alert notification;

detecting a device centerline from the stereo pair of images;

detecting a plurality of markers, including the first and second markers, in the stereo pair of images;

determining whether the stereo pair of images are mirrored based on the centerline and the plurality of markers; and when the stereo pair of images are mirrored, mirroring an expected marker layout prior to determining the distance between the first and second markers based on the mirrored expected marker layout.

20. The method of claim 19, wherein determining the distance includes:

detecting positions of the first and second markers in the pair of stereo images;

determining three-dimensional positions of the first and second markers based on the detected positions; and determining a distance between the three-dimensional positions.

21. The method of claim 19, further comprising, prior to comparing:

determining an active application executing at the mobile computing device; and selecting the threshold from a plurality of application-specific thresholds according to the active application.

* * * * *